(12) United States Patent
Smith et al.

(10) Patent No.: US 12,189,775 B2
(45) Date of Patent: Jan. 7, 2025

(54) SEAMLESS FIRMWARE UPDATE MECHANISM

(71) Applicant: Intel Corporation, Santa Clara, CA (US)

(72) Inventors: Ned M. Smith, Beaverton, OR (US); Andrew Draper, Chesham (GB); Xiaoyu Ruan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 17/725,876

(22) Filed: Apr. 21, 2022

(65) Prior Publication Data

US 2022/0245252 A1    Aug. 4, 2022

Related U.S. Application Data

(60) Provisional application No. 63/312,517, filed on Feb. 22, 2022.

(51) Int. Cl.
*G06F 21/57* (2013.01)

(52) U.S. Cl.
CPC ...... *G06F 21/572* (2013.01); *G06F 2221/033* (2013.01)

(58) Field of Classification Search
CPC .......................... G06F 21/572; G06F 2221/033
See application file for complete search history.

(56) References Cited

U.S. PATENT DOCUMENTS

| | | | | |
|---|---|---|---|---|
| 8,856,771 B2* | 10/2014 | Chalmers | .............. | G06F 21/572 |
| | | | | 717/172 |
| 9,230,129 B1* | 1/2016 | Mao | ...................... | G06F 21/575 |
| 10,218,696 B2* | 2/2019 | Thom | .................... | H04L 63/061 |
| 10,552,613 B2* | 2/2020 | Narasimhan | .......... | G06F 21/572 |
| 10,789,061 B2* | 9/2020 | Dewan | .................. | H04L 9/3234 |
| 11,741,224 B2* | 8/2023 | Smith | ...................... | G06F 21/64 |
| | | | | 726/22 |
| 11,783,045 B2* | 10/2023 | Duval | ..................... | G06F 21/79 |
| | | | | 713/189 |
| 11,797,684 B2* | 10/2023 | Bulygin | ................. | G06F 21/572 |
| 11,843,705 B2* | 12/2023 | Fairfax | .................... | G06F 21/44 |
| 12,039,049 B2* | 7/2024 | Liu | ....................... | G06F 12/1408 |
| 12,047,352 B2* | 7/2024 | Kale | ........................... | G06F 8/65 |
| 2008/0141024 A1* | 6/2008 | Ranganathan | .......... | G06F 21/57 |
| | | | | 713/155 |
| 2011/0131447 A1* | 6/2011 | Prakash | ................. | G06F 9/4408 |
| | | | | 713/189 |
| 2012/0124567 A1* | 5/2012 | Landry | .................... | G06F 8/654 |
| | | | | 717/168 |

(Continued)

*Primary Examiner* — Douglas M Slachta
(74) *Attorney, Agent, or Firm* — Jaffery Watson Mendonsa & Hamilton LLP

(57) ABSTRACT

An apparatus is disclosed. The apparatus comprises one or more processors to receive a request to perform a firmware update at a device, prepare a second trusted compute base (TCB) layer for the firmware update, generate a first compound device identifier (CDI) associated with a first TCB layer to be used by the second TCB layer to attest an operational state of the first TCB layer prior to applying the update and generate a second CDI associated with the first TCB layer to be used by the second TCB layer to attest the operational state of the first layer after the update has been applied and perform the firmware update of the second TCB layer.

20 Claims, 10 Drawing Sheets

(56) References Cited

U.S. PATENT DOCUMENTS

| | | | |
|---|---|---|---|
| 2012/0137137 A1* | 5/2012 | Brickell | G06F 21/73 |
| | | | 713/182 |
| 2014/0372999 A1* | 12/2014 | Becker | G06F 8/654 |
| | | | 717/169 |
| 2017/0180137 A1* | 6/2017 | Spanier | G06F 8/65 |
| 2019/0042230 A1* | 2/2019 | Dewan | G06F 21/57 |
| 2019/0095623 A1* | 3/2019 | Narasimhan | G06F 21/572 |
| 2020/0151335 A1* | 5/2020 | Ayoub | H04L 9/0822 |
| 2020/0193065 A1* | 6/2020 | Smith | G06F 21/73 |
| 2021/0089685 A1* | 3/2021 | Cheruvu | G06F 21/54 |
| 2021/0096837 A1* | 4/2021 | Kim | G06F 21/74 |
| 2021/0314365 A1* | 10/2021 | Smith | H04L 63/20 |
| 2021/0406379 A1* | 12/2021 | Lee | G06F 21/572 |
| 2022/0222348 A1* | 7/2022 | Vaswani | H04L 9/0825 |
| 2022/0350586 A1* | 11/2022 | Moran | G06F 8/61 |
| 2022/0405391 A1* | 12/2022 | Liu | G06F 12/14 |
| 2023/0254162 A1* | 8/2023 | Liu | H04L 9/083 |
| | | | 713/171 |

\* cited by examiner

SEAMLESS FIRMWARE UPDATE MECHANISM

CROSS-REFERENCE

This application claims the benefit of priority to U.S. Provisional Application No. 63/312,517, filed on Feb. 22, 2022 and is hereby incorporated herein by reference in its entirety.

BACKGROUND OF THE DESCRIPTION

Seamless update has the objective of applying a firmware update while the system remains operational, thus avoiding a reset that would incur latency associated with a reboot. Secure boot architectures such as those involving a Device Identifier Composition Engine (DICE) construct an attestable cryptographic identifier using the firmware. If firmware changes, the cryptographic identifier also changes. This ensures unexpected changes to firmware are detectable. The problem is that seamless update of a DICE layer will either require a reset incurring reboot latency or will attest falsely that the current operation is using the pre-update image.

BRIEF DESCRIPTION OF THE DRAWINGS

So that the manner in which the above recited features of the present embodiment can be understood in detail, a more particular description of the embodiment, briefly summarized above, may be had by reference embodiments, some of which are illustrated in the appended drawings. It is to be noted, however, that the appended drawings illustrate only typical embodiments of this embodiment and are therefore not to be considered limiting of its scope, for the embodiment admit to other equally effective embodiments.

DETAILED DESCRIPTION

Figure 1:
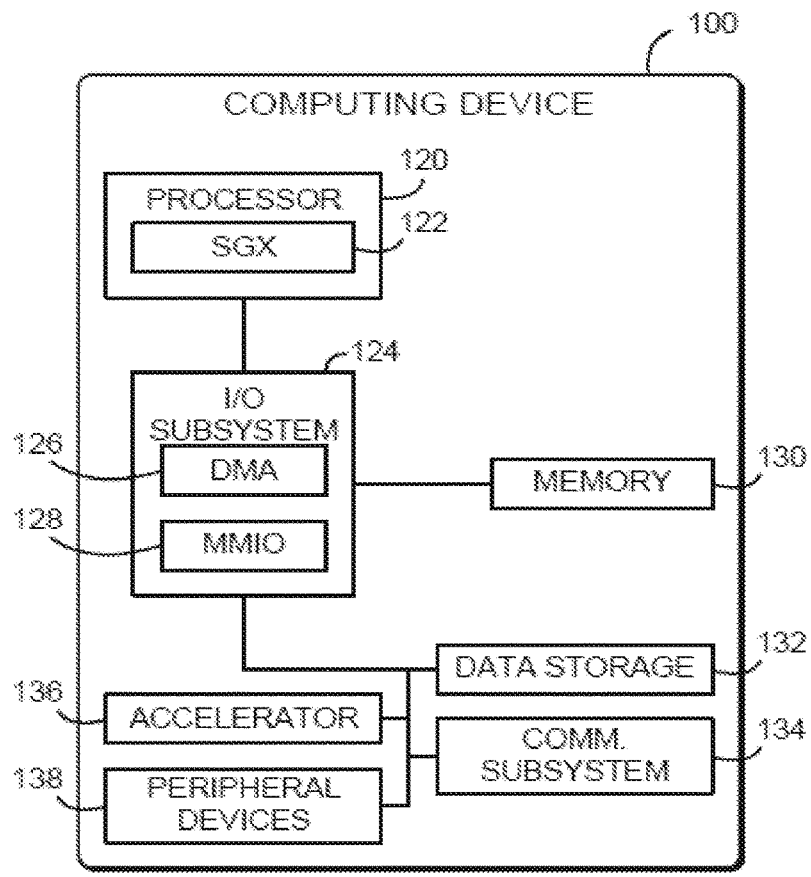
FIG. 1 is a simplified block diagram of at least one embodiment of a computing device for secure I/O with an accelerator device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for secure I/O with an accelerator device includes a processor 120 and an accelerator device 136, such as a field-programmable gate array (FPGA). In use, as described further below, a trusted execution environment (TEE) established by the processor 120 securely communicates data with the accelerator 136. Data may be transferred using memory-mapped I/O (MMIO) transactions or direct memory access (DMA) transactions. For example, the TEE may perform an MMIO write transaction that includes encrypted data, and the accelerator 136 decrypts the data and performs the write. As another example, the TEE may perform an MMIO read request transaction, and the accelerator 136 may read the requested data, encrypt the data, and perform an MMIO read response transaction that includes the encrypted data. As yet another example, the TEE may configure the accelerator 136 to perform a DMA operation, and the accelerator 136 performs a memory transfer, performs a cryptographic operation (i.e., encryption or decryption), and forwards the result. As described further below, the TEE and the accelerator 136 generate authentication tags (ATs) for the transferred data and may use those ATs to validate the transactions. The computing device 100 may thus keep untrusted software of the computing device 100, such as the operating system or virtual machine monitor, outside of the trusted code base (TCB) of the TEE and the accelerator 136. Thus, the computing device 100 may secure data exchanged or otherwise processed by a TEE and an accelerator 136 from an owner of the computing device 100 (e.g., a cloud service provider) or other tenants of the computing device 100. Accordingly, the computing device 100 may improve security and performance for multi-tenant environments by allowing secure use of accelerator devices. As used herein, a TCB comprises a set the set of all hardware, firmware, and/or software components within a computer system that are critical to the system's security.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology. In other embodiments, the secure enclave support 122 may be utilized by Intel® Trusted Domain Extensions (TDX) technology that is implemented to isolate virtual machines from the virtual machine monitor and other virtual machines operating on the computing device 100.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As shown, the memory 130 may be communicatively coupled to the processor 120 via the I/O subsystem 124, which may be embodied as circuitry and/or components to facilitate input/output operations with the processor 120, the memory 130, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 130, the accelerator device 136, and/or other components of the computing device 100, on a single integrated circuit chip. Additionally, or alternatively, in some embodiments the processor 120 may include an integrated memory controller and a system agent, which may be embodied as a logic block in which data traffic from processor cores and I/O devices converges before being sent to the memory 130.

As shown, the I/O subsystem 124 includes a direct memory access (DMA) engine 126 and a memory-mapped I/O (MMIO) engine 128. The processor 120, including secure enclaves established with the secure enclave support 122, may communicate with the accelerator device 136 with one or more DMA transactions using the DMA engine 126 and/or with one or more MMIO transactions using the MMIO engine 128. The computing device 100 may include multiple DMA engines 126 and/or MMIO engines 128 for handling DMA and MMIO read/write transactions based on bandwidth between the processor 120 and the accelerator 136. Although illustrated as being included in the I/O subsystem 124, it should be understood that in some embodiments the DMA engine 126 and/or the MMIO engine 128 may be included in other components of the computing device 100 (e.g., the processor 120, memory controller, or system agent), or in some embodiments may be embodied as separate components.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to affect such communication.

The accelerator device 136 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions), GPUs, etc. Illustratively, the accelerator device 136 is an FPGA, which may be embodied as an integrated circuit including programmable digital logic resources that may be configured after manufacture. The FPGA may include, for example, a configurable array of logic blocks in communication over a configurable data interchange. The accelerator device 136 may be coupled to the processor 120 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. The accelerator device 136 may receive data and/or commands for processing from the processor 120 and return results data to the processor 120 via DMA, MMIO, or other data transfer transactions.

As shown, the computing device 100 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

The computing device 100 may also include a network interface controller (NIC) 150. NIC 150 enables computing device 100 to communicate with another computing device 100 via a network. In embodiments, NIC 150 may comprise a programmable (or smart) NIC, infrastructure processing unit (IPU), or datacenter processing unit (DPU) that may be configured to perform different actions based on a type of packet, connection, or other packet characteristic.

Figure 2:
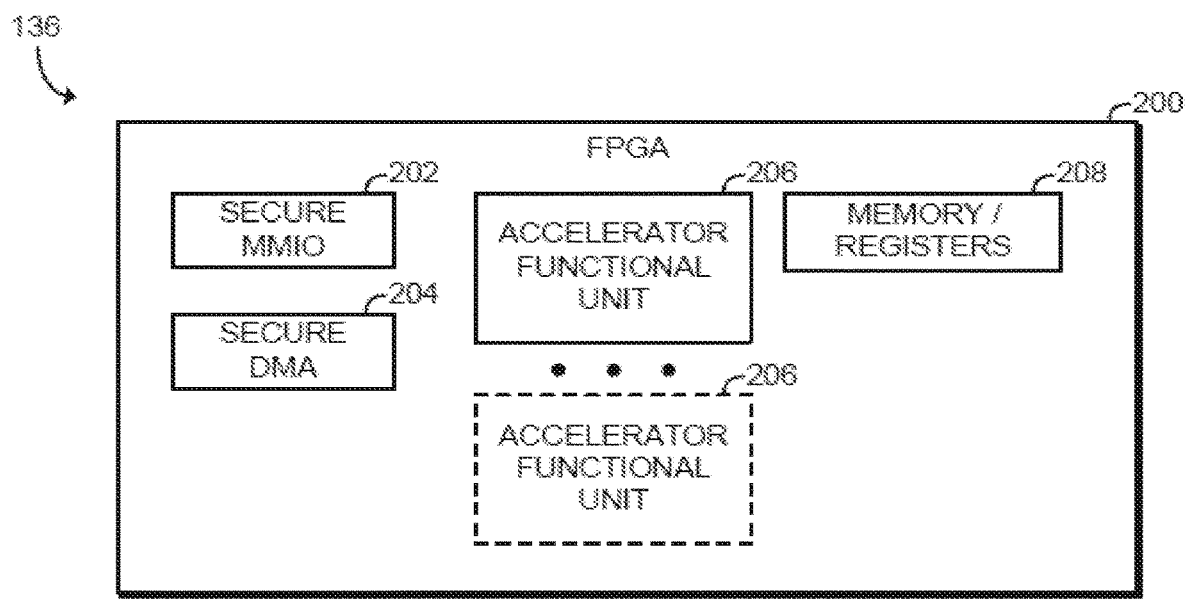
FIG. 2 is a simplified block diagram of at least one embodiment of an accelerator device of the computing device of FIG. 1.

Referring now to FIG. 2, an illustrative embodiment of a field-programmable gate array (FPGA) 200 is shown. As shown, the FPGA 200 is one potential embodiment of an accelerator device 136. The illustratively FPGA 200 includes a secure MMIO engine 202, a secure DMA engine 204, one or more accelerator functional units (AFUs) 206, and memory/registers 208. As described further below, the secure MMIO engine 202 and the secure DMA engine 204 perform in-line authenticated cryptographic operations on data transferred between the processor 120 (e.g., a secure enclave established by the processor) and the FPGA 200 (e.g., one or more AFUs 206). In some embodiments, the secure MMIO engine 202 and/or the secure DMA engine 204 may intercept, filter, or otherwise process data traffic on one or more cache-coherent interconnects, internal buses, or other interconnects of the FPGA 200.

Each AFU 206 may be embodied as logic resources of the FPGA 200 that are configured to perform an acceleration task. Each AFU 206 may be associated with an application executed by the computing device 100 in a secure enclave or other trusted execution environment. Each AFU 206 may be configured or otherwise supplied by a tenant or other user of the computing device 100. For example, each AFU 206 may correspond to a bitstream image programmed to the FPGA 200. As described further below, data processed by each AFU 206, including data exchanged with the trusted execution environment, may be cryptographically protected from untrusted components of the computing device 100 (e.g., protected from software outside of the trusted code base of the tenant enclave). Each AFU 206 may access or otherwise process stored in the memory/registers 208, which may be embodied as internal registers, cache, SRAM, storage, or other memory of the FPGA 200. In some embodiments, the memory 208 may also include external DRAM or other dedicated memory coupled to the FPGA 200.

Figure 3:
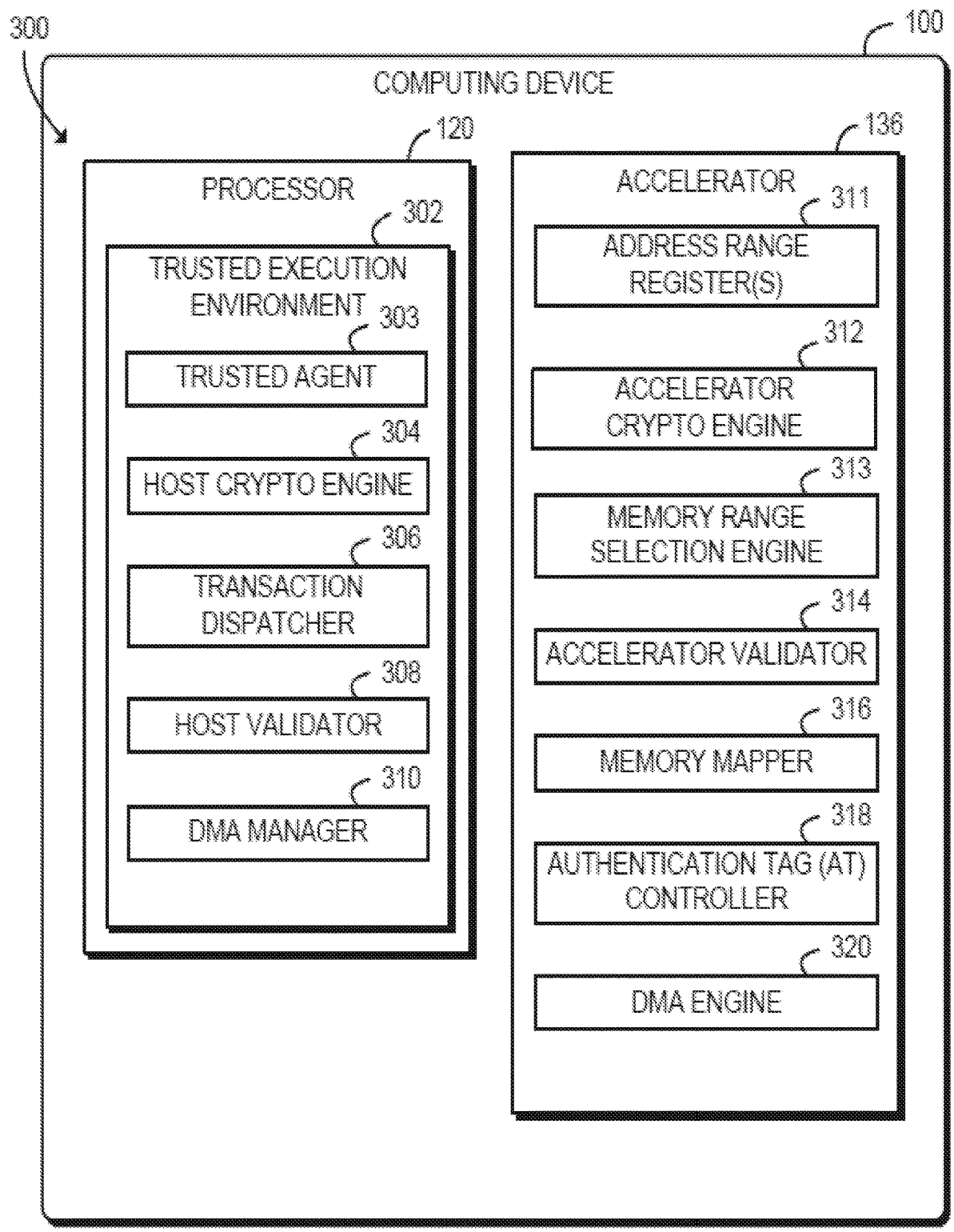
FIG. 3 is a simplified block diagram of at least one embodiment of an environment of the computing device of FIGS. 1 and 2.

Referring now to FIG. 3, in an illustrative embodiment, the computing device 100 establishes an environment 300 during operation. The illustrative environment 300 includes a trusted execution environment (TEE) 302 and the accelerator 136. The TEE 302 further includes a trusted agent 303, host cryptographic engine 304, a transaction dispatcher 306, a host validator 308, and a direct memory access (DMA) manager 310. The accelerator 136 includes an accelerator cryptographic engine 312, a memory range selection engine 313, an accelerator validator 314, a memory mapper 316, an authentication tag (AT) controller 318, and a DMA engine 320. The various components of the environment 300 may be embodied as hardware, firmware, software, or a combination thereof. As such, in some embodiments, one or more of the components of the environment 300 may be embodied as circuitry or collection of electrical devices (e.g., host cryptographic engine circuitry 304, transaction dispatcher circuitry 306, host validator circuitry 308, DMA manager circuitry 310, accelerator cryptographic engine circuitry 312, accelerator validator circuitry 314, memory mapper circuitry 316, AT controller circuitry 318, and/or DMA engine circuitry 320). It should be appreciated that, in such embodiments, one or more of the host cryptographic engine circuitry 304, the transaction dispatcher circuitry 306, the host validator circuitry 308, the DMA manager circuitry 310, the accelerator cryptographic engine circuitry 312, the accelerator validator circuitry 314, the memory mapper circuitry 316, the AT controller circuitry 318, and/or the DMA engine circuitry 320 may form a portion of the processor 120, the I/O subsystem 124, the accelerator 136, and/or other components of the computing device 100. Additionally, in some embodiments, one or more of the illustrative components may form a portion of another component and/or one or more of the illustrative components may be independent of one another.

The TEE 302 may be embodied as a trusted execution environment of the computing device 100 that is authenticated and protected from unauthorized access using hardware support of the computing device 100, such as the secure enclave support 122 of the processor 120. Illustratively, the TEE 302 may be embodied as one or more secure enclaves established using Intel SGX technology and utilized by TDX technology. The TEE 302 may also include or otherwise interface with one or more drivers, libraries, or other components of the computing device 100 to interface with the accelerator 136.

The host cryptographic engine 304 is configured to generate an authentication tag (AT) based on a memory-mapped I/O (MMIO) transaction and to write that AT to an AT register of the accelerator 136. For an MMIO write request, the host cryptographic engine 304 is further configured to encrypt a data item to generate an encrypted data item, and the AT is generated in response to encrypting the data item. For an MMIO read request, the AT is generated based on an address associated with MMIO read request.

The transaction dispatcher 306 is configured to dispatch the memory-mapped I/O transaction (e.g., an MMIO write request or an MMIO read request) to the accelerator 136 after writing the calculated AT to the AT register. An MMIO write request may be dispatched with the encrypted data item.

The host validator 308 may be configured to verify that an MMIO write request succeeded in response dispatching the MMIO write request. Verifying that the MMIO write request succeeded may include securely reading a status register of the accelerator 136, securely reading a value at the address of the MMIO write from the accelerator 136, or reading an AT register of the accelerator 136 that returns an AT value calculated by the accelerator 136, as described below. For MMIO read requests, the host validator 308 may be further configured to generate an AT based on an encrypted data item included in a MMIO read response dispatched from the accelerator 136; read a reported AT from a register of the accelerator 136; and determine whether the AT generated by the TEE 302 matches the AT reported by the accelerator 136. The host validator 308 may be further configured to indicate an error if those ATs do not match, which provides assurance that data was not modified on the way from the TEE 302 to the accelerator 136.

The accelerator cryptographic engine 312 is configured to perform a cryptographic operation associated with the MMIO transaction and to generate an AT based on the MMIO transaction in response to the MMIO transaction being dispatched. For an MMIO write request, the cryptographic operation includes decrypting an encrypted data item received from the TEE 302 to generate a data item, and the AT is generated based on the encrypted data item. For an MMIO read request, the cryptographic operation includes encrypting a data item from a memory of the accelerator 136 to generate an encrypted data item, and the AT is generated based on that encrypted data item.

The accelerator validator 314 is configured to determine whether the AT written by the TEE 302 matches the AT determined by the accelerator 136. The accelerator validator 314 is further configured to drop the MMIO transaction if those ATs do not match. For MMIO read requests, the accelerator validator 314 may be configured to generate a poisoned AT in response to dropping the MMIO read request, and may be further configured to dispatch a MMIO read response with a poisoned data item to the TEE 302 in response to dropping the MMIO read request.

The memory mapper 316 is configured to commit the MMIO transaction in response to determining that the AT written by the TEE 302 matches the AT generated by the accelerator 136. For an MMIO write request, committing the transaction may include storing the data item in a memory of the accelerator 136. The memory mapper 316 may be further configured to set a status register to indicate success in response to storing the data item. For an MMIO read request, committing the transaction may include reading the data item at the address in the memory of the accelerator 136 and dispatching an MMIO read response with the encrypted data item to the TEE 302.

The DMA manager 310 is configured to securely write an initialization command to the accelerator 136 to initialize a secure DMA transfer. The DMA manager 310 is further configured to securely configure a descriptor indicative of a host memory buffer, an accelerator 136 buffer, and a transfer direction. The transfer direction may be host to accelerator 136 or accelerator 136 to host. The DMA manager 310 is further configured to securely write a finalization command to the accelerator 136 to finalize an authentication tag (AT) for the secure DMA transfer. The initialization command, the descriptor, and the finalization command may each be securely written and/or configured with an MMIO write request. The DMA manager 310 may be further configured to determine whether to transfer additional data in response to securely configuring the descriptor, the finalization command may be securely written in response to determining that no additional data remains for transfer.

The AT controller 318 is configured to initialize an AT in response to the initialization command from the TEE 302. The AT controller 318 is further configured to finalize the AT in response to the finalization command from the TEE 302.

The DMA engine 320 is configured to transfer data between the host memory buffer and the accelerator 136 buffer in response to the descriptor from the TEE 302. For a transfer from host to accelerator 136, transferring the data includes copying encrypted data from the host memory buffer and forwarding the plaintext data to the accelerator 136 buffer in response to decrypting the encrypted data. For a transfer from accelerator 136 to host, transferring the data includes copying plaintext data from the accelerator 136 buffer and forwarding encrypted data to the host memory buffer in response to encrypting the plaintext data.

The accelerator cryptographic engine 312 is configured to perform a cryptographic operation with the data in response to transferring the data and to update the AT in response to transferring the data. For a transfer from host to accelerator 136, performing the cryptographic operation includes decrypting encrypted data to generate plaintext data. For a transfer from accelerator 136 to host, performing the cryptographic operation includes encrypting plaintext data to generate encrypted data.

The host validator 308 is configured to determine an expected AT based on the secure DMA transfer, to read the AT from the accelerator 136 in response to securely writing the finalization command, and to determine whether the AT from the accelerator 136 matches the expected AT. The host validator 308 may be further configured to indicate success if the ATs match and to indicate failure if the ATs do not match.

Figure 4:
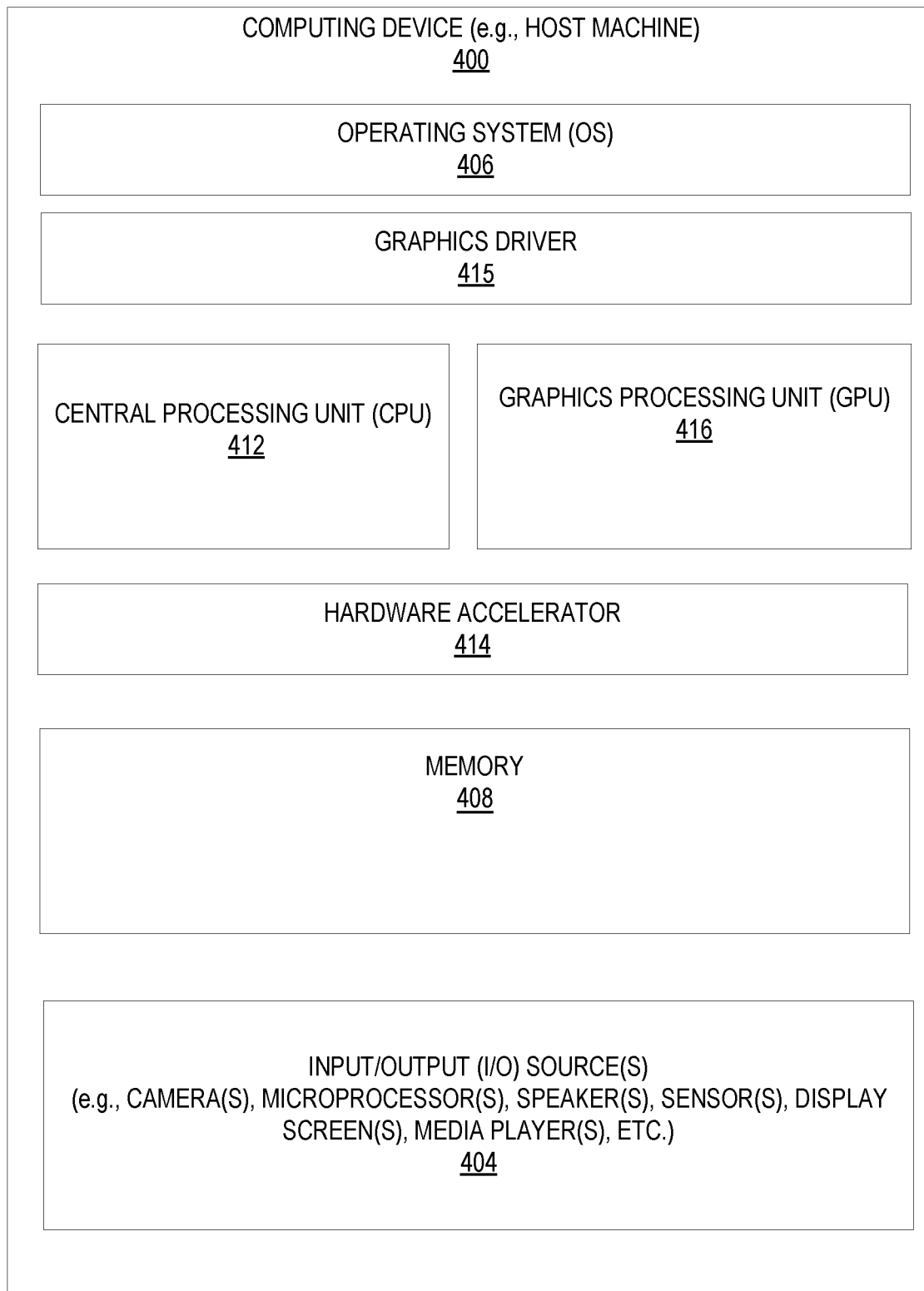
FIG. 4 illustrates a computing device according to implementations of the disclosure.

FIG. 4 illustrates another embodiment of a computing device 400. Computing device 400 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 400 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 400 may include a computer platform hosting an integrated circuit ("IC"), such as a system on a chip ("SOC" or "SOC"), integrating various hardware and/or software components of computing device 400 on a single chip.

As illustrated, in one embodiment, computing device 400 may include any number and type of hardware and/or software components, such as (without limitation) graphics processing unit ("GPU" or simply "graphics processor") 416, graphics driver (also referred to as "GPU driver", "graphics driver logic", "driver logic", user-mode driver (UMD), user-mode driver framework (UMDF), or simply "driver") 415, central processing unit ("CPU" or simply "application processor") 412, hardware accelerator 414 (such as an FPGA, ASIC, a re-purposed CPU, or a re-purposed GPU, for example), memory 408, network devices, drivers, or the like, as well as input/output (I/O) sources 404, such as touchscreens, touch panels, touch pads, virtual or regular keyboards, virtual or regular mice, ports, connectors, etc. Computing device 400 may include operating system (OS) 406 serving as an interface between hardware and/or physical resources of the computing device 400 and a user.

It is to be appreciated that a lesser or more equipped system than the example described above may be utilized for certain implementations. Therefore, the configuration of computing device 400 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

Computing device 400 may host network interface device(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 5:
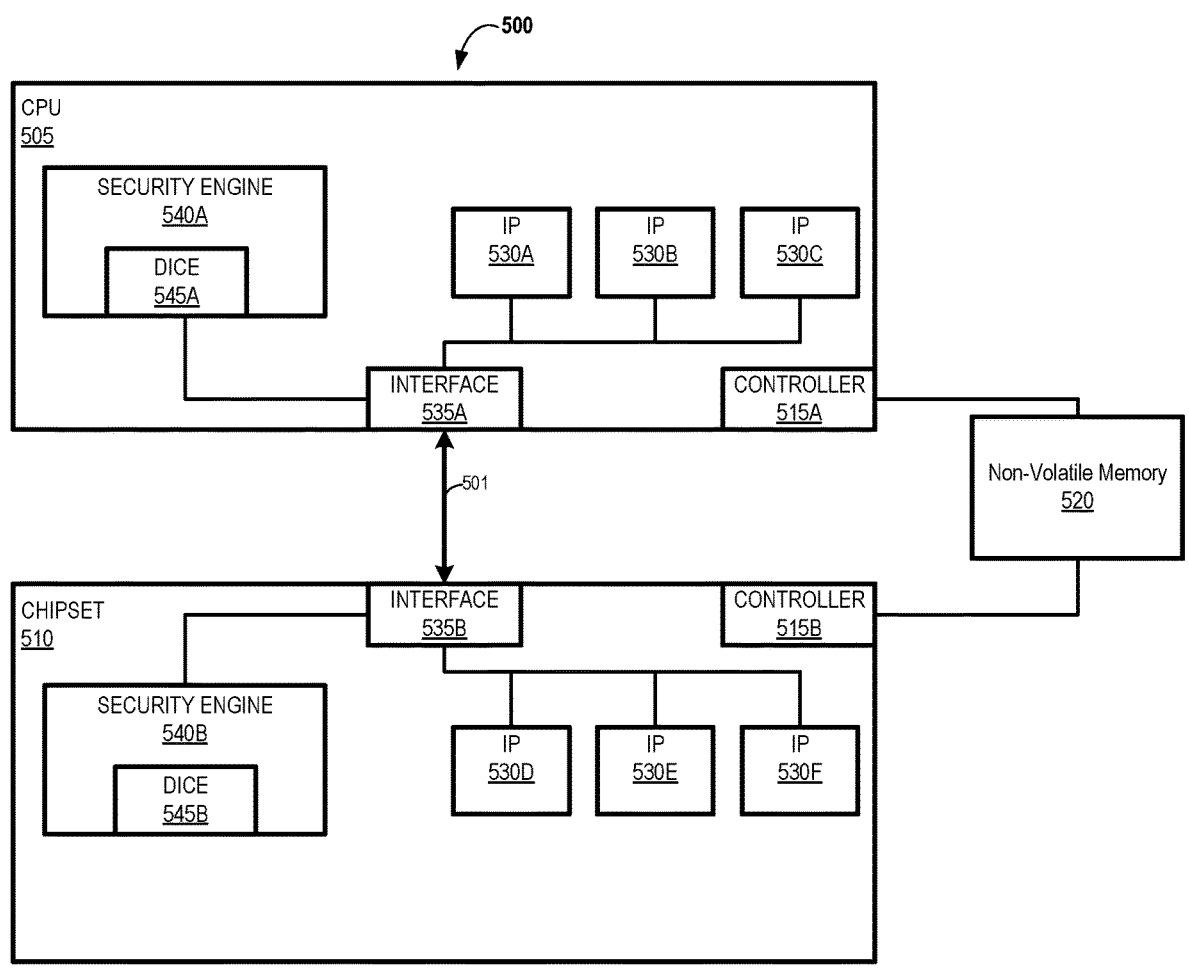
FIG. 5 illustrates one embodiment of a platform.

FIG. 5 illustrates one embodiment of a platform 200. As shown in FIG. 5, platform 500 includes CPU 505 and a chipset 510. In one embodiment, CPU 505 and chipset 510 are implemented on separate integrated circuit (IC) packages (or die). In a further embodiment, CPU 505 and chipset 510 each comprise an interface 535 (e.g., interfaces 535A and 535B) to facilitate communication. In such an embodiment, each interface comprises a link controller. In still a further embodiment, CPU 505 and chipset 510 communicate via a direct media interface (DMI) 501. However, in other embodiments, other types of interfaces (e.g., a flexible display interface (FDI)) may be implemented.

CPU 505 and a chipset 510 further include interconnect protocol (IP) agents 530 (e.g., IP agents 530A-530C within CPU 505 and IP agents 530D-530F within chipset 510). In such an embodiment, the interconnect protocol provides a standardized interface to enable CPU and chipset vendors, as well as third parties, to design logic such as IP agents to be incorporated in chipset 510. IP agents 530 may include general purpose processors (e.g., in-order or out-of-order cores), fixed function units, graphics processors, I/O controllers, display controllers, etc. In such an embodiment, each IP agent 530 includes a hardware interface to provide standardization to enable the IP agent 530 to communicate with other platform 500 components. For example, in an embodiment in which IP agent 530 is a third-party visual processing unit (VPU), interface 535 provides a standardization to enable the VPU to access a memory.

Although discussed herein as a CPU and chipset, other embodiments may feature CPU 505 and chipset 510 as two system on chips (SOCs) (e.g., SOC 505 and SOC 510.

According to one embodiment, CPU 505 and chipset 510 each include a security engine 540 (e.g., 540A and 540B) to perform various security operations (e.g., security processing, cryptographic functions, etc.). In such an embodiment, each security engine 540 comprises a cryptographic processor that is implemented as a Trusted Platform Module (TPM) that operates as a root of trust (or platform RoT) to assure the integrity of hardware and software operating on platform 500. In a further embodiment, the RoT stores and reports measurements that are used for reporting and evaluating the current platform 500 configuration and for providing long-term protection of sensitive information. As used herein, a RoT is defined as a set of functions in a trusted computing module within a host that is always trusted by the host's operating system (OS). The RoT serves as separate compute engine controlling the trusted computing platform cryptographic processor, such as security engine 540, on platform 500.

In one embodiment, each security engine 540 includes a Device Identifier Composition Engine (DICE) 545 (e.g., DICE 545A and 545B) implemented to construct an attestable cryptographic identifier using firmware included in non-volatile memory 520 coupled to CPU 505 and chipset 510 via controller 515A and controller 515B, respectively. In such an embodiment, DICE 545 provides hardware and firmware capability that establishes a verifiable cryptographic identity that attests that an expected TCB is instantiated during a boot process.

In a further embodiment, DICE 545 performs measurements of code (and optionally configuration data) and generates a cryptographically unique value, called a Compound Device Identifier (CDI). The CDI entropy derives from a Unique Device Secret (UDS) and is cryptographically bound to an execution environment by measuring the execution environment's runtime code. This code is sometimes referred to as First Mutable Code (FMC) (or layer 0). The layer 0 measurement is combined with the UDS to produce the CDI.

Figure 6A:
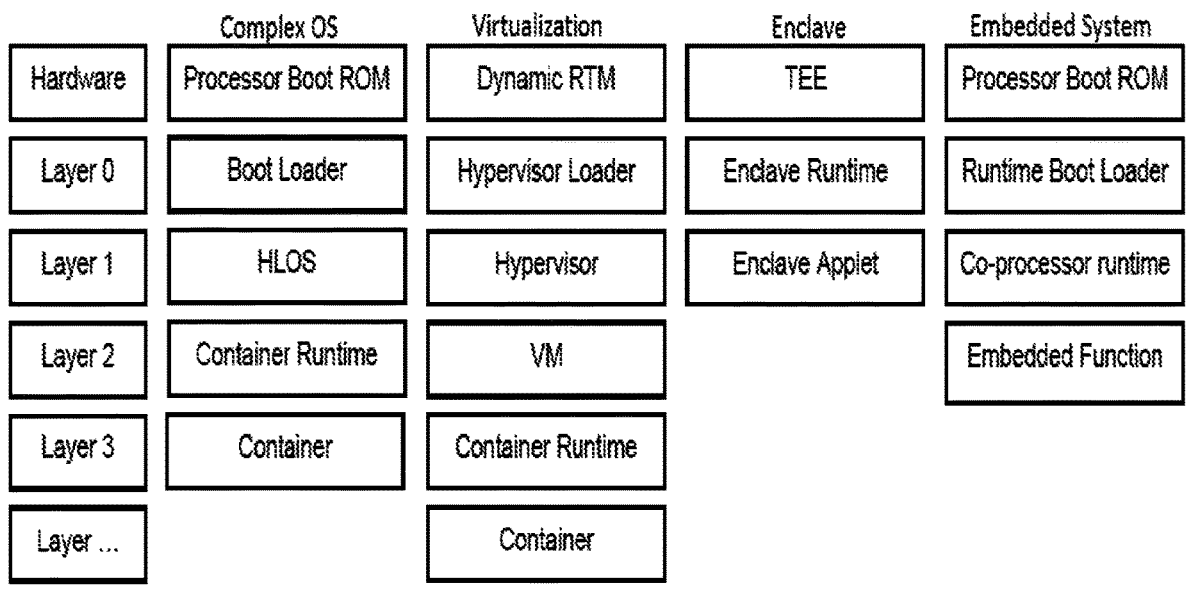
FIG. 6A illustrates examples of DICE system layering.

In one embodiment, DICE 545 comprises a layering architecture that considers execution states that are entered progressing from a base hardware layer (e.g., a hardware Root of Trust (HRoT)). The base hardware layer is assumed to be in a trustworthy state before transitioning to layer 0. Layer 0 is assumed to be in a trustworthy state before transitioning to layer 1, and so on. The base hardware layer comprises a Root of Trust for Measurement (RTM). In one embodiment, transitioning between layers of a DICE layering architecture involves generating a CDI value and securely passing the CDI value to the next layer. In such an embodiment, each layer is measured prior to becoming active. Thus, if a layer is compromised then all subsequent layers likewise are unable to make similar trustworthiness assertions because all CDI dependent keys are changed. FIG. 6A illustrates examples of DICE system layering.

Figure 6B:
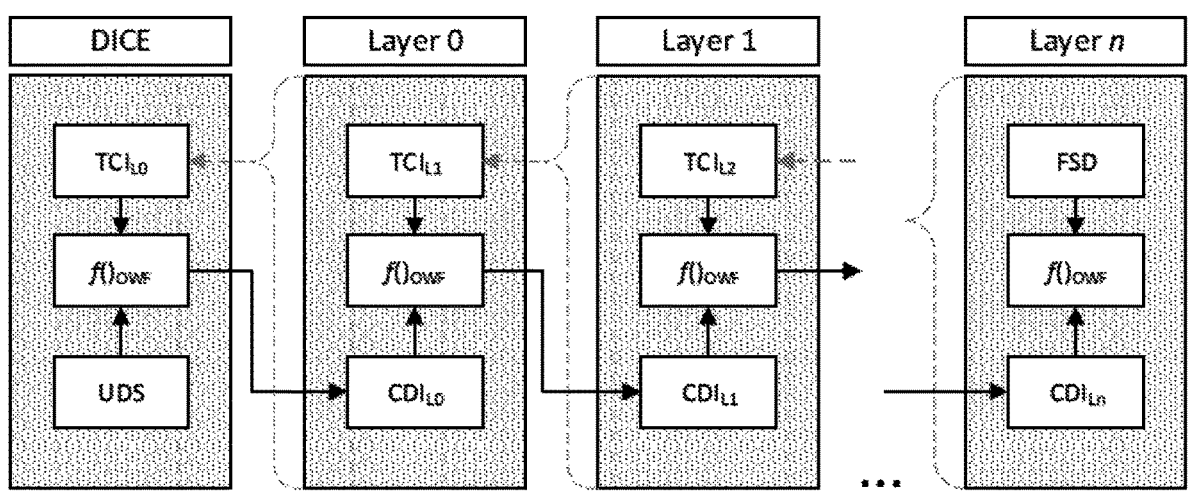
FIG. 6B illustrates one embodiment of a layering architecture.

According to one embodiment, DICE implements a layered TCB architecture that uses a constrained set of TCB capabilities to construct a subsequent (or next) TCB layer. TCB capabilities are assumed to be protected within a hardened execution environment. The transition from one TCB layer to the next is assumed to be protected using interaction capabilities trusted by both TCB layers. FIG. 6B illustrates one embodiment of a layering architecture.

As shown in FIG. 6B, each TCB layer has trusted access to TCB capabilities that can produce a TCB Component Identifier (TCI), a CDI and a one-way-function (OWF). A TCI is a component-specific identifier that describes a TCB component. Examples of TCI values include: (i) a hash computed over runtime code that executes in shielded locations; (ii) a code measurement combined with either a product identifier (e.g., vendor-model version or a vendor-model-SVN1); or (iii) a hash of an FPGA bitstream that can be loaded into programmable hardware. The TCI value for any TCB component that includes firmware or software includes measurement of the firmware or software. Any change to a TCB component results in a different TCI value for that TCB component. A given layer n uses a trustworthy mechanism for computing the TCI value corresponding to a next layer (n+1).

A CDI value received by a layer n is based on a minimum of two input values: (i) the previous CDI value (e.g., CDIn-1); and (ii) the TCI of the target TCB component (e.g., TCIn). The input values are combined using a one-way function (OWF). Additional values may be included in a CDI computation for a given layer. A Unique Device Secret (UDS) supplies a statistically unique value to the DICE HRoT layer since no previous context exists. At layers above the DICE HRoT layer, the CDI value received from the previous TCB component supplies a statistically unique value to the current TCB component. A component uses a trustworthy mechanism for producing the CDI value of a subsequent component and a component uses a trustworthy mechanism for providing that CDI value to a subsequent component. A OWF comprises a cryptographic pseudo-random function (PRF) that accepts seed (s) and data (x) values. The seed and data values for subsequent components comprise the CDI value received from the previous component and the TCB Component Identity (TCI) of the next component, respectively.

As discussed above, seamless update of a DICE layer requires a reset incurring reboot latency or false attestation that the current operation is using a pre-update firmware image. Existing solutions tolerate disparity between the bootstrapped image and the current operational image. The next time the system performs a scheduled reboot the cryptographic identifier is updated to reflect current operational state. The problem with this approach is that a relying party may have a policy that restricts access if one of the firmware images is known to be insecure. Operations using an insecure image when the secure image is expected may result in a security compromise. Operating using the secure image when the insecure image is reported results in denial of service. Taking a reset each time a seamless update is applied negates the value of seamless update. Even if the image is considered secure either before or after the seamless update, the fact that it reports the wrong image contradicts intended semantics of reporting.

According to one embodiment, DICE 545 solves the secure seamless update problem by using two or more CDI values. In such an embodiment, a first CDI value represents a pre-seamless update context and second CDI value represents the post-seamless update context. The pre-seamless update CDI calculation includes both the firmware digest and security version number (SVN), while the post-seamless update context includes a SVN and excludes the digest that will be updated in the CDI calculation. After the seamless update is applied, the second CDI is used to attest operational state, which indicates that a seamless update was applied but that the application of the seamless update does not change the operational trustworthiness properties as represented by the set of measured values (e.g., SVN).

Figure 7:
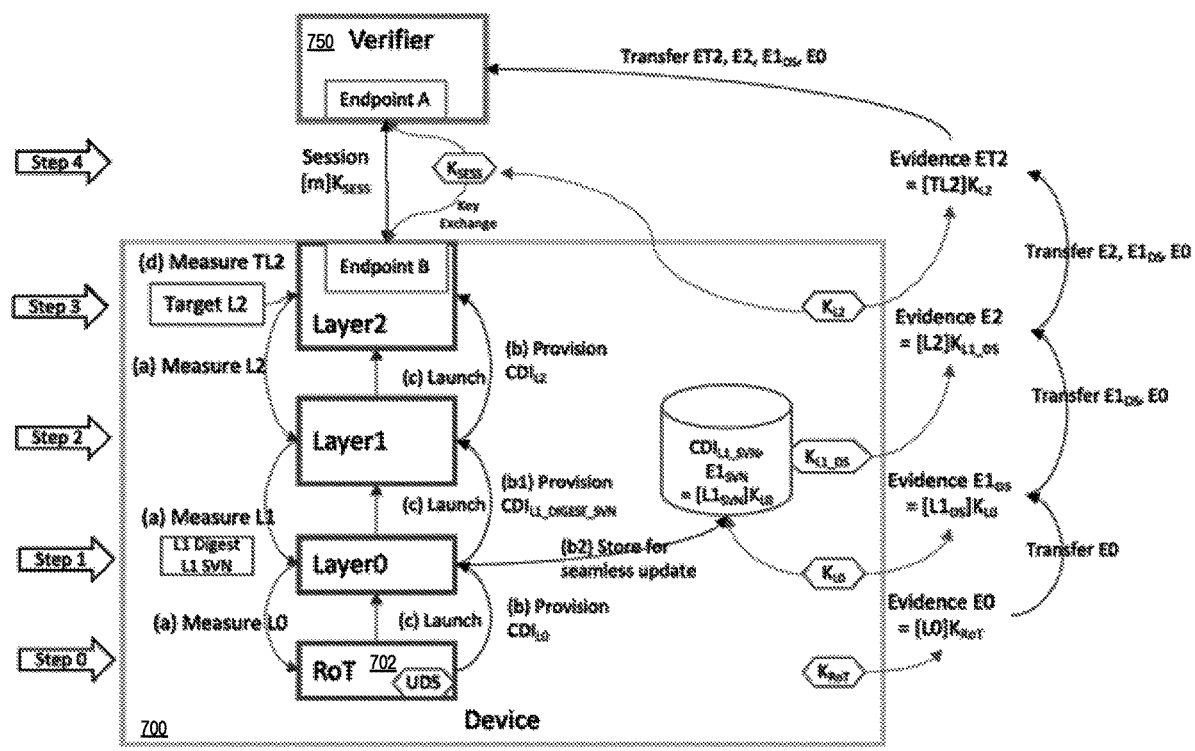
FIG. 7 illustrates one embodiment of a setup to prepare for seamless update.

FIG. 7 illustrates one embodiment of a setup to prepare for seamless update to a layer (e.g., Layer 1). As shown in FIG. 7, a device 700 including a hardware RoT 702 and DICE layers 0-2, as well as an authentication verifier (or verifier) 750. In one embodiment, verifier 750 comprises a layer Embedded Certificate Authority (CA) for attestation. In such an embodiment, verifier 750 verifies that attestation data from device 700 is accurate because it is signed by a TPM at device 700 whose key is certified by the CA.

The typical behavior for secure boot based on a DICE layering scheme has three steps: (a) an attester measures the target environment (e.g., the next layer $L_N$); (b) the attester constructs a $CDI_{LN}$ value for the next layer from the unique device secret (UDS) or from a $CDI_{LN-1}$ value from the previous layer, and provisions $CDI_{LN}$ to the next layer; (c) the current layer loads (or executes) the next layer. Additionally, a step is performed (d) that measures a target environment (e.g., TL2) that happened to be excluded when Layer 1 measured Layer2. For example, TL2 may be a dynamically loaded execution engine, a programmable region in an FPGA or a container invoked on an embedded controller.

In addition to steps (a)-(d) that may occur for each layer, the layer may generate attestation keys used to sign attestation evidence, perform key exchange, issue certificates, or sign a challenge nonce. As shown in FIG. 7, Step 1 shows Layer 0 generating two CDI values, one for use prior to seamless update and another for use after seamless update. Layer 0 may also generate two keys from the respective CDI values and issue two certificates, respectively. Evidence for Layer 0 (e.g., E0) is generated by the root of trust by signing the layer 0 TCI (e.g., L0) using the root of trust UDS. Thus, evidence E0=[L0]$K_{ROT}$. Subsequently, the evidence E0 is transferred to Layer 0 as part of step 0 (c) so that Layer 0 can be a proxy delivery service.

FIG. 7 further shows that in Step 1(a), Layer 0 collects Layer 1 measurements including a digest and an SVN measurement. SVN may be a minimum SVN for Layer 1 that allows updates having an SVN that is greater than or equal to the minimum SVN, or where the SVN of the update is constrained to be equal to the current SVN. For brevity, $X_{SVN}$ is used for both, unless otherwise noted. Other embodiments may feature the collection of other measurements.

In one embodiment, at least two CDI values representing the seamless updated layer ($CDI_{L1\_DIGEST\_SVN}$ and $CDI_{L1\_SVN}$) are generated and provisioned by Layer 0 to Layer 1 as a source of layer specific entropy (see Step 1(b1) and (b2)). For seamless update, all of the measurements implemented to describe the layer prior to seamless update may be included in the $CDI_{L1\_DIGEST\_SVN}$ computation, including the SVN. Prior to installing a seamless update, both CDI values are computed. $CDI_{L1\_SVN}$ is saved for later use while $CDI_{L1\_DIGEST\_SVN}$ is used to generate layer specific keys (i.e., $K_{L1\_DS}$ and later $K_{L1\_SVN}$) and to derive the next layer $CDI_{LN+1}$.

Evidence for Layer 1 for both pre-seamless update ($E1_{DS}$) and post-seamless update ($E1_{SVN}$) is generated by Layer 0 prior to applying the seamless update. Evidence $E1_{DS}$=[$L1_{DS}$]$K_{L0}$ and $E1_{SVN}$=[$L1_{SVN}$]$K_{L0}$. $E1_{SVN}$ is saved for later use (see Step 1 (b2)). In one embodiment, the evidence $E1_{DS}$ and $E1_{SVN}$ are transferred to Layer 1 as part of Step 1 (c), so that Layer 1 can be a proxy delivery service. Alternatively, $E1_{DS}$ may be provided to a directory service. Execution control passes to Layer 0 as part of Step 1(c).

In Step 2, Layer 1 performs sub steps (a), (b) and (c) as described above for Layer 2. This includes signing the Layer 2 evidence (E2) using the pre-seamless update key $K_{L1\_DS}$. Evidence for Layer 2 and any previous layer evidence may be passed to Layer 2 as part of (c). In embodiments, the layers (e.g., layer 1, layer 2, . . . ) may have multiple peers or clones such as an array of cores at each layer where each core follows the same process described herein. In such embodiments, each clone would have its own respective CDI. In further embodiments, a single clone may have multiple CDIs for other reasons such as for keys having different use, lifetimes, security strength, etc.

In Step 3, Layer 2 performs sub-step (d) as described above for the target environment TL2. In one embodiment, TL2 measurements are signed by a Layer 2 attestation key $K_{L2}$. Evidence TL2 (i.e., ET2=[TL2]$K_{L2}$) and any evidence from other layers is passed to verifier 750 as part of an attestation protocol exchange.

In Step 4, Layer 2 and verifier 750 may establish a secure session between themselves based on a session key $K_{SESS}$ that may be signed by $K_{L2}$; such as a signed Diffie-Hellman protocol. Message contents not included in evidence may be attested to Layer 2 because of $K_{SESS}$ having been signed by $K_{L2}$ as part of the key exchange. However, since the Layer 1 digest and SVN are relevant to seamless update and since they are already signed by $K_{L0}$, the attestation properties of $K_{SESS}$ may be unnecessary.

Although described with reference to a seamless update to layer 0, FIG. 7 is representative of any layer. Thus, embodiments may involve updates to multiple (or all) layers that may involve application of the seamless update method multiple times, being careful to properly apply cascaded effects. For example, if Layer 2 also was updated, there could be multiple CDIs for Layer 2. To avoid combinatoric explosion, the update method may bundle updates for different layers, so that they may be applied together. Nevertheless, if a combination of seamless updates may be applied at different layers over time, there may be CDI values that account for the possibility of seamless updates being subsequently applied to higher layers.

Figure 8:
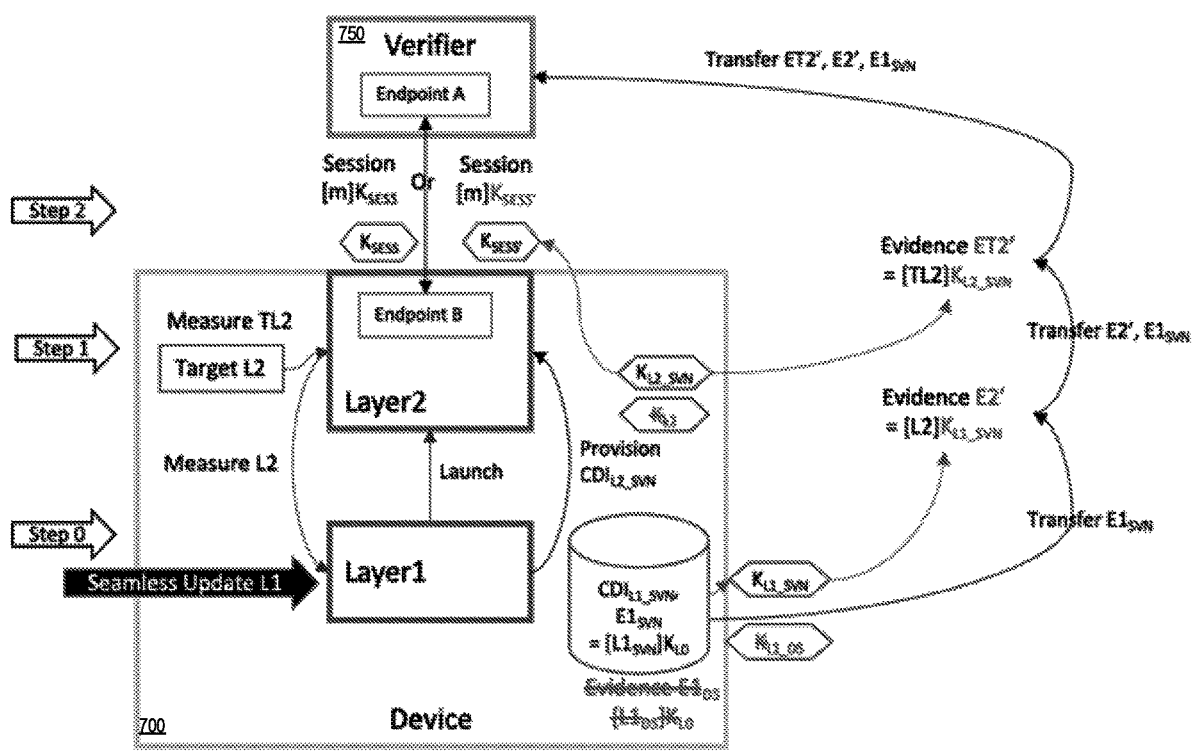
FIG. 8 illustrates one embodiment of a post application of a seamless update.

FIG. 8 illustrates one embodiment of a post application of a seamless update. When a seamless update is applied to Layer 1 (see FIG. 8, Step 0). The update causes the digest of the firmware to change, which invalidates $CDI_{L1\_DIGEST\_SVN}$. Consequently, any keys derived from $CDI_{L1\_DIGEST\_SVN}$ are invalid (e.g., since they no longer represent the measurement of the firmware currently loaded/running). The update processing deletes $CDI_{L1\_DIGEST\_SVN}$ and the keys or secrets derived from it as a way of preventing accidental or malicious abuse. For example, if the new firmware has an exploitable vulnerability, the exploit could result in behavior that uses $CDI_{L1\_DIGEST\_SVN}$ or the keys and secrets derived from it to masquerade as a non-exploited environment.

Layer 1 may now use $CDI_{L1\_SVN}$ to derive keys, attest, authenticate and complete the layer transition to Layer 2. As a result, there is not a need for execution control to pass to a reset vector. In conventional systems, the reset vector is needed to ensure the previous layer, Layer 0, re-measures and re-derives $CDI_{L1\_SVN}$. The stored $CDI_{SVN}$ already exists at Layer 1 may be used when transferring evidence E1 to the Layer 2. Similarly, any keys derived from $CDI_{L1\_SVN}$ that may have been generated and stored may be used. For example, $K_{L1\_SVN}$ may be used to sign evidence about Layer 2 (i.e., E2'=[L2]$K_{L1\_SVN}$).

If one of these keys $K_{SVN}$ is used before the update is applied (i.e., while $CDI_{L1\_DIGEST\_SVN}$ is still valid), there isn't a security concern because the SVN may be valid for both the current firmware and the updated firmware, because the SVN measurement for Layer 1 is a minimum SVN value. If the seamless update contained firmware or software that was associated with a different more recent SVN, the policy for handling a minimum SVN allows for the pre-seamless update TCB (Trusted Computing Base) to be accepted by verifier 750 even though it is not identical to the post-seamless update TCB. If, however, the updated firmware/software is later found to have vulnerabilities, the Layer 1 SVN may be incremented thereby invalidating the previous (minimum) SVN. The minimum SVN logic would no longer apply, and a reset vector is needed to reestablish Layer 1 as a known secure TCB.

Also shown in FIG. 8, Step 2, the Layer 2 key ($K_{L2}$) is no longer implicitly attesting to the post-seamless update configuration. The $K_{L2}$ is to be deleted to prevent Layer 2 from falsely asserting the pre-seamless update configuration. The Layer 2 evidence (and the Target L2 environment evidence) may be signed with $K_{L1\_SVN}$ and $K_{L2\_SVN}$ respectively, so that the possible security vulnerabilities included in the pre-seamless update of Layer 1 are not cascaded into the L2 and TL2 environments. In one embodiment, the session key $K_{SESS'}$ may be renegotiated using $K_{L2}$ SVN to ensure messages m exchanged over the session that are not also described in evidence may be implicitly attested using $K_{SESS}$. However, if the application associated with verifier 750 does not require implicit attestation of m, then the prior session context may be used post seamless update.

Figure 9A:
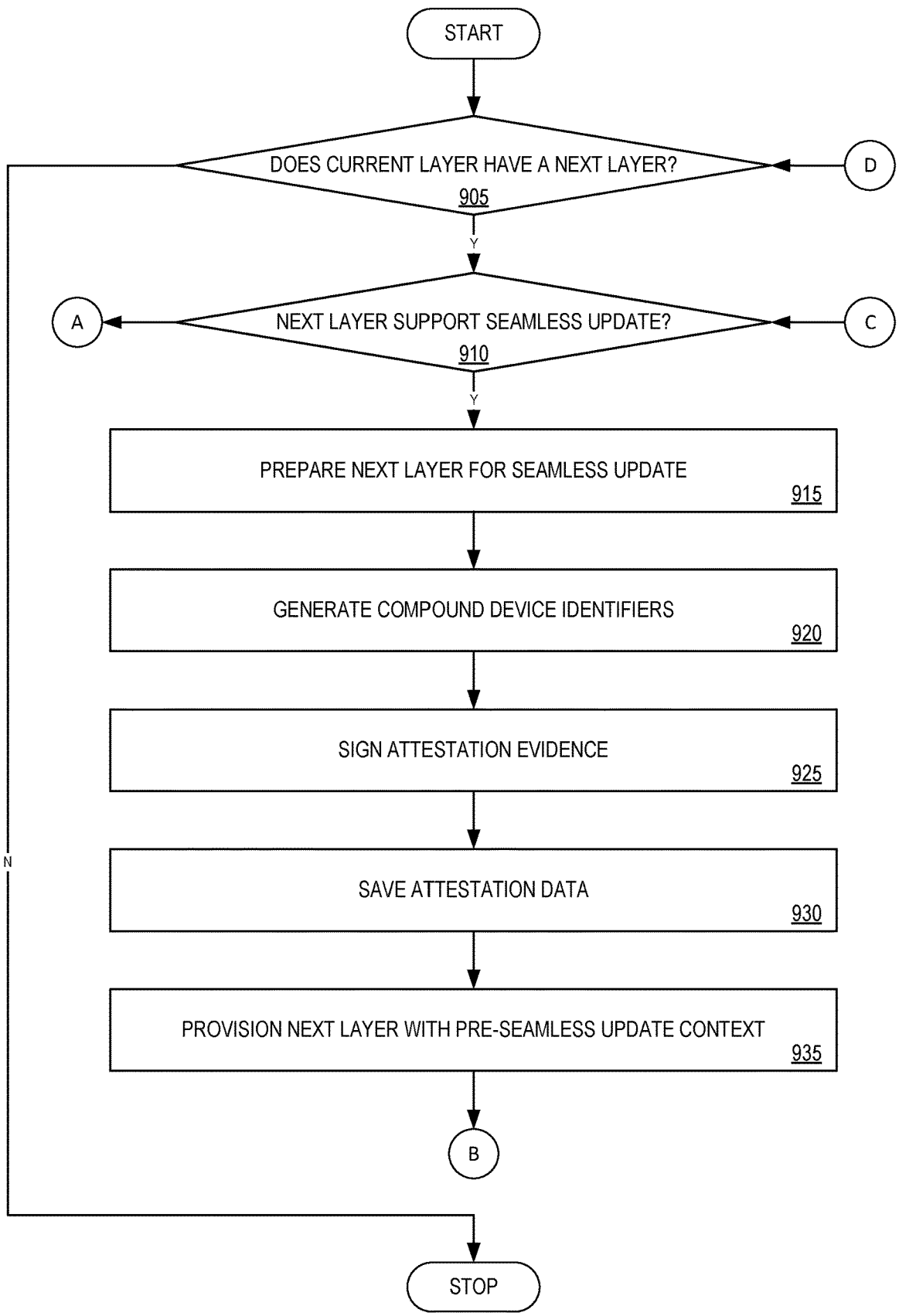
FIGS. 9A&9B is a flow diagram illustrating one embodiment of a seamless update process.
Figure 9B:
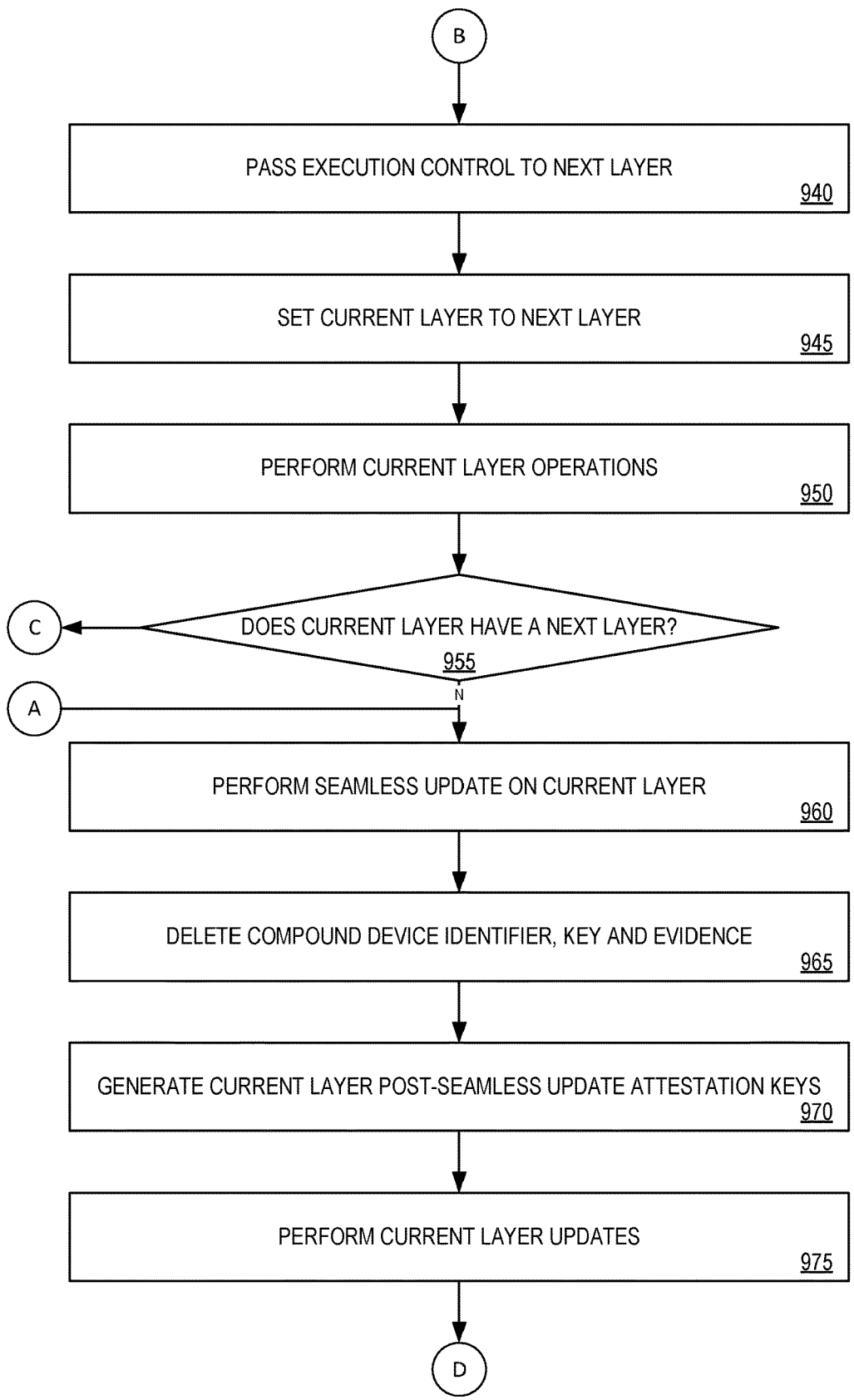

FIGS. 9A&9B is a flow diagram illustrating one embodiment of a seamless update process. At decision block 905 (FIG. 9A), a determination is made as to whether a current layer (e.g., layer n) has a next layer (layer n+1). If not, the process is completed. Otherwise, a determination is made as to whether layer n+1 supports seamless update, decision block 910. If so, layer n+1 is prepared for seamless update. In one embodiment, preparation of layer n+1 for seamless update comprises collecting pre-update measurements ($M_{bsu}$) (e.g., digest of layer firmware) and collecting post-update measurements ($M_{asu}$) (e.g., SVN), processing block 915. At processing block 920, CDIs ($CDI_{asu}$) are generated for use before seamless update and for use after seamless update. For example, $CDI_{bsu}$=OWF($CDI_N$, $TCI_{BSU}$, ...) and $CDI_{asu}$=OWF($CDI_N$, $TCI_{ASU}$, ...).

At processing block 925, attestation evidence for before seamless update ($E_{bsu}$) and after seamless update ($E_{asu}$) is signed using the layer n attestation key, where $E_{bsu}$=[$M_{bsu}$]$K_n$ and $E_{asu}$=[$M_{asu}$]$K_n$. (At processing block 930, attestation data (e.g., $E_{asu}$, $CDI_{asu}$) is saved for after seamless update in layer n+1 accessible storage. At processing block 935, layer n+1 is provisioned with the pre-seamless update context (e.g., $CDI_{bsu}$ and $E_{bsu}$). At processing block 940 (FIG. 9B), execution control is passed to layer n+1. At processing block 945, the current layer is set to the next layer (e.g., n=n+1). Additionally, layer n pre-seamless update attestation keys (e.g., $K_{bsu}$) are generated. At processing block 950, current layer operations (e.g., application specific and layering transition) are performed using $K_{bsu}$. At decision block 955, a determination is made as to whether the current layer has a next layer. If so, control is returned to decision block 910 (FIG. 9A), where the process is repeated.

Upon a determination at decision block 910 that layer n+1 does not support seamless update, or at decision block 955 that whether the current layer has a next layer, the seamless update is performed on the current layer, processing block 960. At processing block 965, $CDI_{bsu}$, $K_{bsu}$ and $E_{bsu}$ are deleted. At processing block 970, post-seamless update attestation keys (e.g., $K_{asu}$) are generated. At processing block 975, current layer operations are performed using $K_{asu}$. Subsequently, control is returned to decision block 905, where the process is repeated.

The above-described mechanism realizes the latency savings of seamless update while not falsely triggering a security warning when a DICE layer attests.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus comprising one or more processors to receive a request to perform a firmware update at a device, prepare a second trusted compute base (TCB) layer for the firmware update, generate a first compound device identifier (CDI) associated with a first TCB layer to be used by the second TCB layer to attest an operational state of the first TCB layer prior to applying the update and generate a second CDI associated with the first TCB layer to be used by the second TCB layer to attest the operational state of the first layer after the update has been applied and perform the firmware update of the second TCB layer.

Example 2 includes the subject matter of Example 1, wherein the first CDI comprises a firmware digest and security version number (SVN) associated with the first TCB layer and the second CDI comprises the SVN.

Example 3 includes the subject matter of Examples 1 and 2, wherein preparing the second TCB layer for the firmware update comprises collecting pre-update firmware measurements of the second TCB layer and collecting post-update firmware measurements second TCB layer.

Example 4 includes the subject matter of Examples 1-3, wherein the one or more processors further signs first attestation evidence to be used prior to the firmware update using a first encryption key associated with the first TCB layer and signing second attestation evidence to be used after the firmware update using the encryption key.

Example 5 includes the subject matter of Examples 1-4, wherein the one or more processors further save the second attestation evidence and the second CDI within the second TCB layer.

Example 6 includes the subject matter of Examples 1-5, wherein the one or more processors further provision the second TCB layer with the first attestation evidence and the first CDI.

Example 7 includes the subject matter of Examples 1-6, wherein the one or more processors further delete the first CDI, the first encryption key and the first attestation evidence after the firmware update has been performed.

Example 8 includes the subject matter of Examples 1-7, wherein the one or more processors generate a second encryption key associated with the second TCB layer.

Some embodiments pertain to Example 9 that includes a method comprising receiving a request to perform a firmware update at a device, preparing a second trusted compute base (TCB) layer for the firmware update, generating a first compound device identifier (CDI) associated with a first TCB layer to be used by the second TCB layer to attest an operational state of the first TCB layer prior to applying the update, generating a second CDI associated with the first TCB layer to be used by the second TCB layer to attest the operational state of the first layer after the update has been applied and performing the firmware update of the second TCB layer.

Example 10 includes the subject matter of Example 9, wherein preparing the second TCB layer for the firmware update comprises collecting pre-update firmware measurements of the second TCB layer and collecting post-update firmware measurements second TCB layer.

Example 11 includes the subject matter of Examples 9 and 10, further comprising signing first attestation evidence to be used prior to the firmware update using a first encryption key associated with the first TCB layer and signing second attestation evidence to be used after the firmware update using the encryption key.

Example 12 includes the subject matter of Examples 9-11, further comprising saving the second attestation evidence and the second CDI within the second TCB layer.

Example 13 includes the subject matter of Examples 9-12, further comprising provisioning the second TCB layer with the first attestation evidence and the first CDI.

Example 14 includes the subject matter of Examples 9-13, further comprising deleting the first CDI, the first encryption key and the first attestation evidence after the firmware update has been performed.

Example 15 includes the subject matter of Examples 9-14, further comprising generating a second encryption key associated with the second TCB layer.

Some embodiments pertain to Example 16 that includes at least one computer readable medium having instructions stored thereon, which when executed by one or more processors, cause the processors to receive a request to perform a firmware update at a device, prepare a second trusted compute base (TCB) layer for the firmware update, generate a first compound device identifier (CDI) associated with a first TCB layer to be used by the second TCB layer to attest an operational state of the first TCB layer prior to applying the update, generate a second CDI associated with the first TCB layer to be used by the second TCB layer to attest the operational state of the first layer after the update has been applied and perform the firmware update of the second TCB layer.

Example 17 includes the subject matter of Example 16, wherein preparing the second TCB layer for the firmware update comprises collecting pre-update firmware measurements of the second TCB layer and collecting post-update firmware measurements second TCB layer.

Example 18 includes the subject matter of Examples 16 and 17, having instructions stored thereon, which when executed by one or more processors, further cause the processors to sign first attestation evidence to be used prior to the firmware update using a first encryption key associated with the first TCB layer and sign second attestation evidence to be used after the firmware update using the encryption key.

Example 19 includes the subject matter of Examples 16-18, having instructions stored thereon, which when executed by one or more processors, further cause the processors to save the second attestation evidence and the second CDI within the second TCB layer and provision the second TCB layer with the first attestation evidence and the first CDI.

Example 20 includes the subject matter of Examples 16-19, having instructions stored thereon, which when executed by one or more processors, further cause the processors to delete the first CDI, the first encryption key and the first attestation evidence after the firmware update has been performed.

The embodiments have been described above with reference to specific embodiments. Persons skilled in the art, however, will understand that various modifications and changes may be made thereto without departing from the broader spirit and scope of the embodiment as set forth in the appended claims. The foregoing description and drawings are, accordingly, to be regarded in an illustrative rather than a restrictive sense.

What is claimed is:

1. An apparatus comprising:
   one or more processors to:
   receive a request to perform a firmware update at a device;
   prepare a second trusted compute base (TCB) layer for the firmware update;
   generate a first compound device identifier (CDI) associated with a first TCB layer, wherein a CDI is a cryptographic identifier and generating a CDI includes measuring an execution environment's runtime code and generating a cryptographically unique value;
   attest an operational state of the first TCB layer prior to applying the firmware update, wherein the attesting the operational state of the first TCB layer is performed by the second TCB layer using the first CDI;
   generate a second CDI associated with the first TCB layer;
   apply the firmware update of the second TCB layer; and
   attest the operational state of the first TCB layer after applying the firmware update, wherein the attesting the operational state of the first TCB layer after applying the firmware update is performed by the second TCB layer using the second CDI.

2. The apparatus of claim 1, wherein the first CDI comprises a firmware digest and security version number (SVN) associated with the first TCB layer and the second CDI comprises the SVN.

3. The apparatus of claim 1, wherein preparing the second TCB layer for the firmware update comprises collecting pre-update firmware measurements of the second TCB layer and collecting post-update firmware measurements second TCB layer.

4. The apparatus of claim 3, wherein the one or more processors further sign first attestation evidence to be used prior to the firmware update using a first encryption key associated with the first TCB layer and sign second attestation evidence to be used after the firmware update using the encryption key.

5. The apparatus of claim 4, wherein the one or more processors further save the second attestation evidence and the second CDI within the second TCB layer.

6. The apparatus of claim 5, wherein the one or more processors further provision the second TCB layer with the first attestation evidence and the first CDI.

7. The apparatus of claim 6, wherein the one or more processors further delete the first CDI, the first encryption key and the first attestation evidence after the firmware update has been performed.

8. The apparatus of claim 7, wherein the one or more processors generate a second encryption key associated with the second TCB layer.

9. A method comprising:
   receiving a request to perform a firmware update at a device;
   preparing a second trusted compute base (TCB) layer for the firmware update;
   generating a first compound device identifier (CDI) associated with a first TCB layer, wherein a CDI is a cryptographic identifier and generating a CDI includes measuring an execution environment's runtime code and generating a cryptographically unique value;
   attesting an operational state of the first TCB layer prior to applying the firmware update, wherein the attesting the operational state of the first TCB layer is performed by the second TCB layer using the first CDI;
   generating a second CDI associated with the first TCB layer;
   applying the firmware update of the second TCB layer; and attest the operational state of the first TCB layer after applying the firmware update, wherein the attesting the operational state of the first TCB layer after applying the firmware update is performed by the second TCB layer using the second CDI.

10. The method of claim 9, wherein preparing the second TCB layer for the firmware update comprises:
collecting pre-update firmware measurements of the second TCB layer; and
collecting post-update firmware measurements second TCB layer.

11. The method of claim 10, further comprising:
signing first attestation evidence to be used prior to the firmware update using a first encryption key associated with the first TCB layer; and
signing second attestation evidence to be used after the firmware update using the encryption key.

12. The method of claim 11, further comprising saving the second attestation evidence and the second CDI within the second TCB layer.

13. The method of claim 12, further comprising provisioning the second TCB layer with the first attestation evidence and the first CDI.

14. The method of claim 13, further comprising deleting the first CDI, the first encryption key and the first attestation evidence after the firmware update has been performed.

15. The method of claim 14, further comprising generating a second encryption key associated with the second TCB layer.

16. At least one non-transitory computer readable medium having instructions stored thereon, which when executed by one or more processors, cause the processors to:
receive a request to perform a firmware update at a device;
prepare a second trusted compute base (TCB) layer for the firmware update;
generate a first compound device identifier (CDI) associated with a first TCB layer, wherein a CDI is a cryptographic identifier and generating a CDI includes measuring an execution environment's runtime code and generating a cryptographically unique value;
attest an operational state of the first TCB layer prior to applying the firmware update, wherein the attesting the operational state of the first TCB layer is performed by the second TCB layer using the first CDI;
generate a second CDI associated with the first TCB layer;
apply the firmware update of the second TCB layer; and
attest the operational state of the first TCB layer after applying the firmware update, wherein the attesting the operational state of the first TCB layer after applying the firmware update is performed by the second TCB layer using the second CDI.

17. The computer readable medium of claim 16, wherein preparing the second TCB layer for the firmware update comprises:
collecting pre-update firmware measurements of the second TCB layer; and
collecting post-update firmware measurements second TCB layer.

18. The computer readable medium of claim 17, having instructions stored thereon, which when executed by one or more processors, further cause the processors to:
sign first attestation evidence to be used prior to the firmware update using a first encryption key associated with the first TCB layer; and
sign second attestation evidence to be used after the firmware update using the encryption key.

19. The computer readable medium of claim 18, having instructions stored thereon, which when executed by one or more processors, further cause the processors to:
save the second attestation evidence and the second CDI within the second TCB layer; and
provision the second TCB layer with the first attestation evidence and the first CDI.

20. The computer readable medium of claim 19, having instructions stored thereon, which when executed by one or more processors, further cause the processors to delete the first CDI, the first encryption key and the first attestation evidence after the firmware update has been performed.

* * * * *